United States Patent Office 3,331,015
Patented July 11, 1967

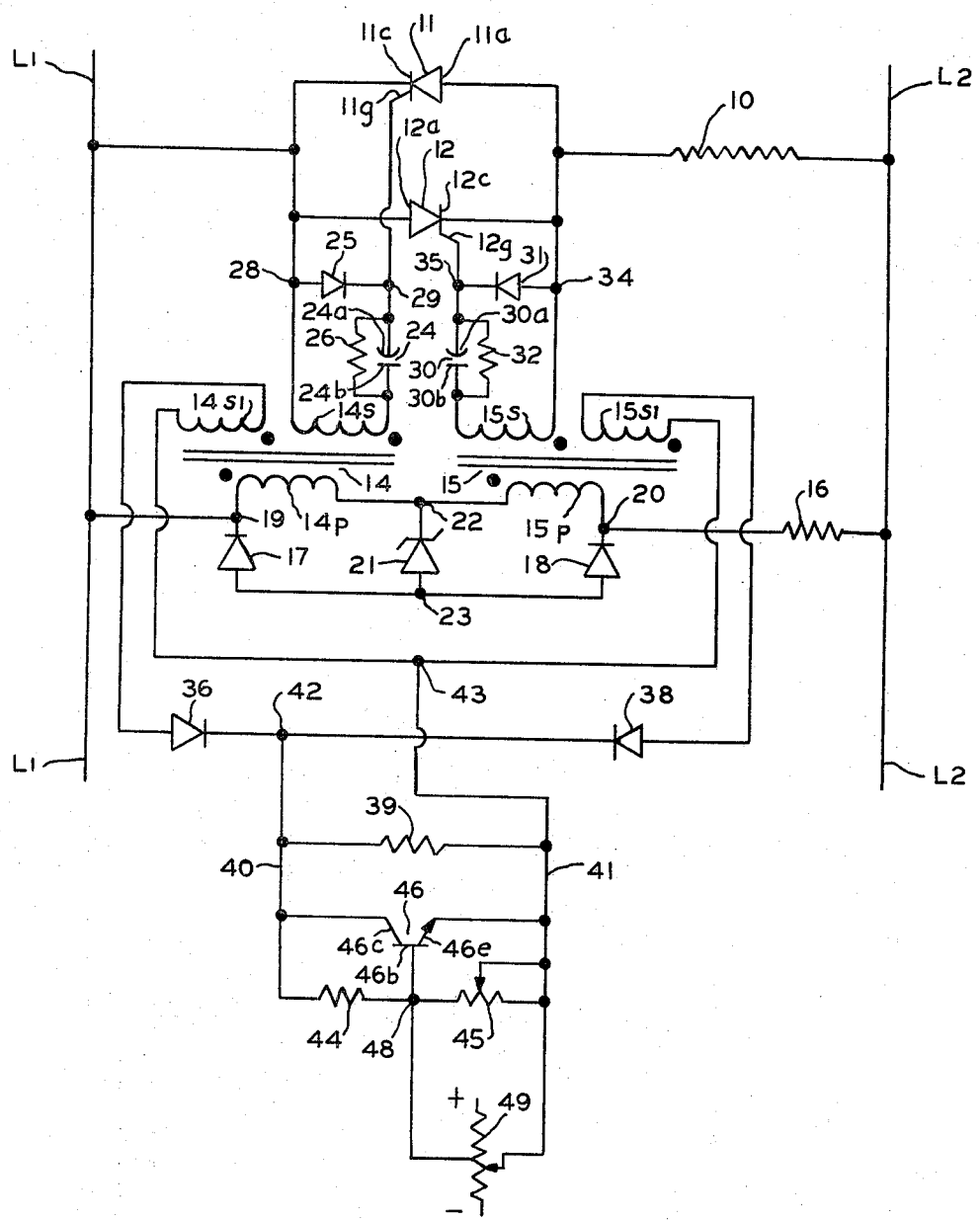

3,331,015
RECTIFIER CONTROL CIRCUIT
Gerald T. Johnston, East Cleveland, Ohio, assignor to Square D Company, Park Ridge, Ill., a corporation of Michigan
Filed July 13, 1964, Ser. No. 382,268
16 Claims. (Cl. 323—22)

This invention relates to a circuit for supplying pulses of voltage from an alternating current source to an electrical device, and more particularly to a firing circuit for a silicon controlled rectifier employing a capacitor and a controlled saturable transformer for supplying pulses of voltage to the silicon controlled rectifier which, in turn, controls the power supplied to an external load.

Because of the differences in magnitude of the voltages required to cause the firing or conduction of silicon controlled rectifiers, which differences are increased upon changes in temperature, it is desirable that the firing voltage have a steep wave front. To obtain the steep wave front in alternate half cycles, the signals must be pulsed.

A circuit in accordance with the invention is adapted for connection to a pair of silicon controlled rectifiers which are connected in inverse parallel relation in series with a load across an A-C source and which are arranged so that the gating circuits of the controlled rectifiers are subjected to voltage pulses discretely controlled in phase angle. The voltage pulses are supplied by the discharge of capacitors, and the instant during each voltage half cycle at which a discharge occurs is determined by control of a pair of saturable transformers.

The circuit comprises, for each silicon controlled rectifier, a capacitor connected in a loop circuit with the gate and cathode of the controlled rectifier and with a secondary winding of a saturable transformer. The saturable transformer, which has its primary winding supplied by an alternating current source, provides current through its secondary winding to charge the capacitor. When the transformer saturates and will no longer support a voltage, the capacitor discharges through the junction between the gate and cathode of the controlled rectifier, thereby to initiate conduction of the controlled rectifier. Saturation of the saturable transformer is controlled by a resetting voltage in a separate control winding of the saturable transformer. A transistorized control circuit determines the resetting voltage.

It is an object of this invention to provide an improved circuit for firing a silicon controlled rectifier.

Another object is to provide an improved circuit for firing a silicon controlled rectifier by voltage pulses derived from the discharge of a capacitor.

A further object is to provide, for controlling the conduction of a silicon controlled rectifier, a circuit in which voltage impulses for firing the silicon controlled rectifier are derived from a capacitor controlled by a saturable transformer.

A further object of this invention is to provide a circuit for supplying pulses of voltage from an alternating current source to an electrical device, the circuit comprising a saturable transformer having a primary winding adapted for connection across the alternating current source and having a secondary winding, a capacitor, a unidirectional current conducting means, the capacitor and the unidirectional current conducting means being interconnected with each other and with the secondary winding so as to permit current from the secondary winding to charge the capacitor through the unidirectional current conducting means when the primary winding is connected across the source and the transformer is unsaturated, means adapted for connection to an electrical device so as to provide a discharge path for the capacitor, the capacitor being operative to discharge when the saturable transformer saturates, and control means for controlling the saturation of the transformer such that the instant during a half wave of the voltage from the alternating current source at which the capacitor starts to discharge can be determined.

Various other objects and advantages will become apparent from the following specification, wherein reference is made to the drawing, in which:

The single figure is a wiring diagram of a circuit embodying the invention.

Referring to the wiring diagram, an external load 10 is supplied with alternating current from an alternating current source, indicated by a pair of conductors L1 and L2, through a pair of semi-conductor rectifiers, such as silicon controlled rectifiers 11 and 12, connected in inverse parallel relationship. The rectifiers 11 and 12 have respective anodes 11a and 12a, respective gates 11g and 12g, and respective cathodes 11c and 12c. The cathode 11c and the anode 12a are connected to the conductor L1 and the cathode 12c and the anode 11a are connected, through the load 10, to the conductor L2.

For controlling the rectifiers 11 and 12, there is provided, in accordance with this invention, a circuit including a pair of saturable transformers 14 and 15 having respective primary windings 14p and 15p and respective main secondary windings 14s and 15s. Transformers 14 and 15 have respective control means such as additional secondary windings 14sl and 15sl. The dots near each of the windings of the transformers 14 and 15 indicate that the ends of the windings adjacent their respective dots will be of like polarity with respect to each other at any instant while the transformers are energized.

The primary windings 14p and 15p and a resistor 16 are connected in series with each other in the order recited across the conductors L1 and L2. A pair of unidirectional current conducting means such as rectifiers 17 and 18 are connected in back-to-back relation between a junction 19, intermediate the primary winding 14p and the conductor L1, and a junction 20, intermediate the primary winding 15p and the resistor 16. A Zener diode 21 interconnects a junction 22, between the windings 14p and 15p, and a junction 23, between the rectifiers 17 and 18.

A charging circuit for capacitor 24 comprises the secondary winding 14s and a unidirectional current conducting means or diode 25 connected in a loop circuit with the capacitor 24. A resistor 26 shunts the capacitor 24. A junction 28 between the winding 14s and the diode 25 is connected to the common junction of the cathode 11c and the anode 12a, which, in turn, is connected to the conductor L1. A junction 29 between the diode 25 and the capacitor 24 is connected to the gate 11g. Similarly, the charging circuit for a capacitor 30 comprises the secondary winding 15s and a diode 31 connected in a loop circuit with the capacitor 30. A resistor 32 shunts the capacitor 30. A junction 34 between the winding 15s and the diode 31 is connected to the common junction of the anode 11a and the cathode 12c, which, in turn, is connected to the load 10. A junction 35 between the diode 31 and the capacitor 30 is connected to the gate 12g.

The additional secondary windings 14sl and 15sl are connected in series with each other in a loop circuit including a pair of oppositely poled diodes 36 and 38. A resistor 39 is connected across a pair of conductors 40 and 41 extending respectively from a common junction 42, between the rectifiers 36 and 38, and from a common junction 43, between the windings 14sl and 15sl. Also connected across the conductors 40 and 41 is a voltage divider means comprising a fixed resistor 44 and an adjustable resistor 45 connected in series with each other. A transistor 46 has its collector 46c connected to the conductor 40, its emitter 46e connected to conductor 41, and its base 46b connected to a junction 48 between the resistors 44 and 45. A source of direct current of variable voltage and selective polarity, indicated by a potentiometer 49, is connected across the resistor 45. The potentiometer 49 is connected to a suitable source of direct current as indicated.

The rectifiers 11 and 12 permit current flow, only for the remaining portion of a half cycle of alternating voltage after they have been turned on or fired by voltages rendering their respective gates positive with respect to their respective cathodes. A controlled rectifier is said to "fire" at that point of the voltage half cycle when it begins to conduct current in its forward direction. This firing point, or firing angle, may be caused to occur, as desired, at substantially any point in the voltage half cycle by proper control of the voltage across the junction between the gate and the cathode of the rectifier.

Thus, by providing a discretely phased voltage pulse across the junction between the gate 11g and the cathode 11c of the rectifier 11, the rectifier 11 can be caused to fire at a selected instant during the half cycle of voltage when the conductor L2 is positive. The firing of the rectifier 12 may be controlled in a similar manner so that the rectifier 12 conducts current for a predetermined portion of the voltage half cycle when the conductor L1 is positive. In this manner, the amount of power in the form of an alternating current transmitted to the load 10 may be controlled. Voltage pulses of the proper polarity necessary to fire the rectifiers 11 and 12 are supplied by the capacitors 24 and 30, respectively. The manner in which the charge and discharge of the capacitors 24 and 30 is controlled will now be described.

The Zener diode 21 is so selected that, during each voltage half cycle, it breaks down and conducts in its blocking, or reverse, direction very early in the half cycle. For example, a breakdown voltage of 6 volts has been found desirable when the voltage at the conductors L1 and L2 is in the 110–120 volt range. The rectifiers 17 and 18 are poled to insure that the voltage across the Zener diode 21 is always in a direction such that the Zener diode can conduct only in its reverse direction. Because the Zener diode 21 is effectively in parallel with the winding 15p when L1 is positive, the voltage across the winding 15p cannot exceed the predetermined Zener or breakdown voltage of the diode 21. Similarly when L2 is positive, the voltage across the winding 14p cannot exceed the predetermined Zener voltage.

During the voltage half cycle when the conductor L1 is positive, the polarity of the voltage across the primary winding 14p is such that the end of the winding 14p at the junction 19 is positive with respect to the end of the winding at the junction 22. During the same voltage half cycle, the polarity of the voltage across the primary winding 15p is such that the end of the winding 15p at the junction 22 is positive with respect to the end of the winding 15p at the junction 20. For the time being, only the voltage across the primary winding 15p and its effect upon the remainder of the circuit will be considered.

When the conductor L1 is positive, the polarity of the voltage induced in the winding 15s is such that the end of the winding 15s adjacent its polarity dot is positive with respect to its other end, and the capacitor 30 is very rapidly charged through a circuit including the junction 34 and the diode 31 so that the side 30a of the capacitor 30 is positive with respect to its side 30b.

During the charging of the capacitor 30, the rectifier 12 is prevented from firing because its cathode 12c is positive with respect to its gate 12g. A controlled rectifier is said to be "back-biased" under such conditions. Because the capacitor 30 becomes fully charged in a very short time, it is desirable to continue the back-bias across the junction between the cathode 12c and gate 12g for a time after the capacitor 30 is charged in order to prevent accidental firing of the rectifier 12 due to spurious voltage pulses from the source. This is the function of the resistor 32. The resistor 32 permits current to continue to flow through the loop circuit including the secondary winding 15s and the diode 31 after the capacitor 30 is charged and so long as voltage of the proper polarity is induced in the winding 15s. The voltage drop across the diode 31 caused by this continued flow of current through the resistor 32 is impressed across the junction between the cathode 12c and the gate 12g and is of the proper polarity to maintain the back-bias across the rectifier 12.

It is thus seen that, shortly after the start of the voltage half cycle with the conductor L1 positive, the capacitor 30 becomes charged in a direction so that the side 30a is positive with respect to its side 30b and the charge is maintained so long as adequate voltage is induced in the secondary winding 15s. Conduction of the rectifier 12c is thus prevented. The winding 15s, however, provides this voltage only so long as the core of the transformer 15 is unsaturated. If, during the half cycle of voltage when L1 is positive, saturation of the core of the transformer 15 occurs, voltage no longer is induced in the secondary winding 15s. Consequently, the capacitor 30 discharges. Because the side 30a of the capacitor 30 is positive with respect to its side 30b, the discharge current is prevented from flowing through the diode 31 in its reverse direction; instead, the discharge current flows in a loop circuit including the junction 35, the gate 12g, the cathode 12c, the junction 34 and the secondary winding 15s, thereby causing the rectifier 12 to fire. The capacitor 30 releases its stored energy in a few microseconds, thereby providing a sharp pulse of voltage of the proper polarity to turn on the rectifier 12. It should be noted that during discharge, the voltage across the secondary winding 15s is of such polarity as to maintain the core of the transformer 15 saturated.

During the next voltage half cycle when the conductor L2 is positive with respect to the conductor L1, a voltage appears across the primary winding 14p such that the end of the winding at the junction 22 is positive with respect to the end at the junction 19. During this half cycle, the Zener diode 21 limits the voltage across the primary winding 14p to a predetermined low value. The capacitor 24 charges and holds its charge until, at some point during this half-cycle, the core of the transformer 14 saturates thereby permitting the capacitor 24 to discharge through the gate 11g and cathode 11c so as to fire the rectifier 11 in the manner described above in more detail for the rectifier 12.

Thus far, it has been shown that the rectifiers 11 and 12 fire when the respective capacitors 24 and 30 discharge through the junction between the gates and cathodes of the respective rectifiers and that such discharge of the capacitors occurs at the instant the cores of the respective transformers 14 and 15 saturate. It may therefore be seen that the firing angle of the rectifiers 11 and 12 can be accurately controlled if the instant in the voltage half cycle at which the cores of the transformers saturate is controlled. The manner in which saturation of the transformer cores is controlled will now be explained.

During the voltage half cycle when L2 is positive with respect to L1, and immediately following the half cycle in which saturation of the transformer 15 and consequent discharge of the capacitor 30 and firing of the rectifier 12 occurred, the voltage across the primary winding 15p is of a polarity to cause the saturable transformer 15 to reset. Clearly, the extent to which the transformer 15 is reset is dependent upon the voltage across the winding 15p. Because of the configuration of the circuit including the winding 15sl, current transformer action occurs between the windings 15p and 15sl. Therefore, control of the voltage across the secondary winding 15sl during the half cycle when the core of the transformer 15 is being reset, that is, when L2 is positive, will control the extent to which it is reset. Similarly, resetting of the core of the transformer 14 occurs during the half cycle in which L1 is positive.

The manner of controlling the voltage across the windings 14sl and 15sl will now be described. The pair of diodes 36 and 38 block concurrent flow of current through the windings 14sl and 15sl so that current flows in only the one of these windings on the core which is being reset. Thus, when the conductor L2 is positive, for example, the respective ends of the windings 14sl and 15sl not having polarity dots will be positive with respect to their other ends so that current flows in the secondary winding 15sl through the diode 38 and is prevented by the diode 36 from flowing in the secondary winding 14sl.

Because the windings 15p and 15sl act as windings of a current transformer, the voltage across the secondary winding 15sl and consequently that across the primary winding 15p is determined by the voltage across the conductors 40 and 41. The voltage across the conductors 40 and 41 is determined by the circuitry including the transistor 46 and resistors 39, 44 and 45. If this voltage is such that the resultant voltage in the winding 15p is equal to that which caused the transformer 15 to go into saturation, then its core will be reset an equivalent amount so that on the next following cycle, when L1 is positive, its core will saturate at the same point on the voltage half cycle. A voltage less than that voltage which caused saturation will cause the flux in the core of the transformer 15 to be reset to a lesser extent so that saturation will occur earlier during the next following half cycle thereby causing earlier firing of the rectifier 12. If, on the other hand, the resetting voltage is greater than that voltage which caused saturation, the firing point will be later in the voltage half cycle. It is evident that the voltage in the secondary winding 15sl can be such that the flux in the core of the transformer 15 is reset to a point preventing saturation from occurring during the following half cycle, thus to cut off the firing of the rectifier 12. The firing point of the rectifier 11 is similarly controlled by the voltage across the winding 14sl.

Control of the voltage across the secondary windings 14sl and 15sl is provided by the parallel combination of the resistor 39, the resistors 44 and 45, and the collector to emitter circuit of the transistor 46 as controlled by the voltage drop across the resistor 45. The ohmic values of the resistor 44 and the resistor 45 are so selected that the resistor 45 can be adjusted to cause the voltage drop across the resistor 45 and hence across the junction of the base 46b and the emitter 46e of the transistor 46 to be sufficient to maintain the collector to emitter circuit of the transistor conductive in the absence of a control signal from the potentiometer 49.

By proper selection of the resistance values of the resistors 44 and 45, the transistor 46 functions to regulate the voltage between the conductors 40 and 41. If, for example, it is desired that the voltage between the conductors 40 and 41 is to be maintained at 12 volts, then the resistances of the resistors 44 and 45 are so selected and the resistor 45 so adjusted that the transistor 46 will not become conductive through its collector and emitter circuit until the voltage between the conductors 40 and 41 rises to 12 volts. When the voltage between conductors 40 and 41 rises to 12 volts, the voltage drop across the resistor 45 and, hence, across the junction of the base 46b and the emitter 46e will cause the transistor 46 to conduct current through its collector and emitter circuit. Because the voltage drop across the base 46b and the emitter 46e cannot exceed that which was necessary to initiate conduction of the transistor 46, the voltage drop across the resistor 45 will be maintained at a substantially constant value. Consequently, the voltage drop across the resistors 44 and 45, which constitute a voltage divider, will be regulated at 12 volts. Any tendency of the voltage across the resistors 44 and 45 and, hence, between the conductors 40 and 41 to increase will effect only an increase in the amount of current conducted through the transistor 46 while maintaining the voltage substantially at its regulated value. Thus, by proper selection of the resistance values in the series combination of resistors 44 and 45, and in the absence of a control signal from the potentiometer 49, the transistor can be caused to regulate the voltage between the conductors 40 and 41, and, hence, to maintain the voltage across the windings 14sl and 15sl at a predetermined value. The predetermined value of voltage at which the transistor 46 regulates in the absence of a signal from the potentiometer 49 may be increased or decreased, selectively, by changing the adjustment of the resistor 45.

By applying, across the resistor 45, a control signal from the potentiometer 49 of the polarity indicated in the drawing, the transistor 46 can be caused to maintain a regulated voltage at a magnitude less than that which is established solely by the voltage divider. By adjusting the potentiometer 49, while maintaining the polarity indicated, the regulated voltage may be selectively decreased in the range between its predetermined regulating voltage in the absence of a control signal and its minimum regulating voltage. The minimum regulating voltage is, of course, that voltage drop across the junction between the collector and emitter of the transistor 46 which is inherent in the transistor when it is fully conducting. This minimum regulating voltage permits the cores of the transformers 14 and 15 to be reset sufficiently on their respective resetting half cycles so that, on the subsequent firing half cycles in which the firing pulses are to occur very near the beginning of the half cycle of voltage, the respective capacitors 24 and 30 can become fully charged.

If the polarity of the control signal from the potentiometer 49 is reversed from that indicated in the drawing, the magnitude of the regulated voltage effected by the transistor 46 will be greater than that regulated value which is established solely by the voltage divider. By adjusting the potentiometer 49 while maintaining a polarity reversed from that indicated, the regulated voltage may be selectively increased in the range between its predetermined regulating voltage which is established solely by the voltage divider and its maximum regulating voltage. The maximum regulating voltage is obtained when the control signal from the potentiometer 49 is such as to cause the collector to emitter circuit of the transistor 46 to be completely nonconductive. The magnitude of the maximum regulating voltage is determined by the ohmic value of the resistors 39, 44 and 45, the resistance of the resistor 39 being selected so that its voltage drop will not exceed the maximum rating of the transistor.

Thus, by the selective application of a control signal from the potentiometer 49, the amount by which each of the cores of the transformers 14 and 15 is reset can be selectively determined so that on the following half cycles the respective cores will saturate at substantially any point in the voltage half cycle which is thus selected.

Having thus described my invention, I claim:

1. A circuit for supplying pulses of voltage from an alternating current source to an electrical device, said circuit comprising:
   an electrical device;
   a saturable transformer having a primary winding adapted for connection across a source of alternating current and having a secondary winding;
   a capacitor;
   unidirectional current conducting means;
   said capacitor and said unidirectional current conducting means being interconnected with each other and with said secondary winding so as to permit current from said secondary winding to charge said capacitor through said unidirectional current conducting means when said primary winding is connected across the source and said transformer is unsaturated;
   means connecting said electrical device directly across said unidirectional current conducting means thereby to provide a discharge path for said capacitor;
   said capacitor being operative to discharge through said discharge path consequent upon saturation of said saturable transformer; and control means operative to control the saturation of said saturable transformer so as to predetermine the instant during a half wave of the voltage of said source at which said capacitor starts to discharge.

2. A circuit according to claim 1 wherein said capacitor and said unidirectional current conducting means are connected with each other in a loop circuit across said secondary winding.

3. A circuit according to claim 2 wherein a resistor is connected in parallel with said capacitor with one terminal of the resistor connected between the capacitor and secondary winding and the other terminal of the resistor connected between the capacitor and diode, thereby permitting current to continue to flow in said loop circuit after said capacitor becomes fully charged.

4. A circuit according to claim 1 wherein said control means comprises
an additional secondary winding in inductive relation to said primary winding and
voltage regulation means for controlling the voltage induced in said additional secondary winding.

5. A circuit according to claim 4 wherein said voltage regulation means comprises:
a pair of conductors connected to the terminals of said additional secondary winding, respectively;
voltage divider means comprising a pair of serially connected resistor means;
a transistor having an emitter, a base, and a collector;
said voltage divider means and the transistor circuit through said collector and emitter being connected in parallel with each other across said pair of conductors to define a regulating circuit;
said base of said transistor being connected to the common junction between said pair of serially connected resistor means;
control signal means connected across said common junction and said emitter; and
an additional unidirectional current conducting means interposed in one of said pair of conductors between said additional secondary and said regulating circuit and poled to permit current flow through said transistor circuit.

6. A circuit according to claim 5 wherein an additional resistor is connected in said regulating circuit in parallel with said transistor circuit to limit the voltage thereacross when said transistor circuit is nonconductive.

7. A circuit according to claim 1 wherein voltage limiting means is interconnected with said primary winding and operative to limit the voltage across said primary winding to a value materially below the voltage of the source when said primary winding is connected across the source.

8. A circuit according to claim 7 wherein said voltage limiting means comprises a Zener diode and electrical connections therefrom to the respective terminals of said primary winding.

9. A circuit for supplying discrete pulses of voltage from an alternating curent source and comprising:
a saturable transformer having a primary winding adapted for connection across the alternating current source and having a secondary winding;
capacitor means and unidirectional current conducting means connected in series with each other across said secondary winding, in a manner causing said capacitor to accumulate a charge when the primary winding is energized by the source and said transformer is unsaturated;
a discharge path for said capacitor means, said capacitor means being operative to discharge through said path when said transformer saturates thereby to provide a discrete pulse of voltage; and
control means for controlling the saturation of the transformer so as to predetermine the instant during a half-wave of the voltage of the source at which said transformer saturates, said control means comprising an additional secondary winding in inductive relation to said primary winding and voltage regulation means for controlling the voltage induced in said additional secondary winding.

10. A circuit for supplying pulses of voltage from an alternating current source to an electrical device, said circuit comprising:
a saturable transformer having a primary winding adapted for connection across a source of alternating current and having two secondary windings;
a capacitor;
a unidirectional current conducting diode;
said capacitor and said diode being interconnected in a circuit with each other and with one of said secondary windings so as to permit current from said one of said secondary windings to charge said capacitor through said diode when said primary winding is connected across the source and said transformer is unsaturated;
means interconnected with the other of said secondary windings and operative to control the saturation of said saturable transformer;
a load circuit; said capacitor being operative to discharge through said load circuit upon saturation of said transformer thereby to provide a pulse of voltage to said electrical device.

11. A firing circuit for a silicon controlled rectifier, said circuit comprising:
a silicon controlled rectifier having a gate, an anode and a cathode;
a saturable transformer having a primary winding and two secondary windings;
said primary winding being adapted for connection to a source of alternating current;
a capacitor;
a unidirectional current conducting means;
said capacitor and said unidirectional current conducting means being connected in series with each other in a loop circuit across one of said secondary windings;
said unidirectional current conducting means being poled to permit current to flow in a first direction through said loop circuit for charging said capacitor when said transformer is unsaturated and said primary winding is connected to said source, and to block current flow in a direction opposite to said first direction;
said gate and said cathode being connected across said unidirectional current conducting means and in series with the capacitor so that, when current flows through said loop circuit in said first direction, said cathode is biased positively with respect to said gate;
a resistor connected in parallel with said capacitor for permitting current to continue to flow in said first direction in said loop circuit after said capacitor is fully charged;
said capacitor being operative upon saturation of said saturable transformer to discharge through said gate and cathode to cause said gate to become biased positively with respect to said cathode; and
means interconnected with the other of said secondary windings and operative to control the saturation of said saturable transformer.

12. A circuit for supplying pulses of voltage from an alternating current source to an electrical device, said circuit comprising:
an electrical device having at least two pairs of terminals;
a pair of saturable transformers each having a primary winding adapted for energization by a source of alternating current and each having a secondary winding;
a pair of capacitors;
a pair of unidirectional current conducting means;

a first means connecting one of said capacitors and one of said unidirectional current conducting means in series with each other across one of said secondary windings to permit current from said one secondary winding to charge said one capacitor through said one unidirectional current conducting means when the primary winding of one transformer is connected across said source and said one transformer is unsaturated;

first circuit means connecting one of said pairs of terminals of said electrical device directly across said one unidirectional curent conducting means thereby to provide a discharge path for said one capacitor;

means separate from said first means connecting the other of said capacitors and the other of said unidirectional current conducting means in series with each other across the other of said secondary windings to permit current from said other secondary winding to charge said other capacitor through said other unidirectional current conducting means when the primary winding of the other transformer is connected across said source and said other transformer is unsaturated;

second circuit means connecting another of said pairs of terminals of said electrical device directly across said other unidirectional current conducting means thereby to provide a discharge path for said other capacitor; and a single control means operative to control the saturation of both of said saturable transformers, each of said capacitors being operative to discharge through its associated discharge path when its associated saturable transformer saturates and thereby provide a pulse of voltage to said electrical device.

13. A circuit according to claim 12 wherein separate resistors are provided, one for each capacitor, and each of said resistors is connected in parallel with its associated capacitor and in series with its associated diode for permitting current to continue to flow through its associated unidirectional current conducting means, after its associated capacitor has become fully charged.

14. A circuit according to claim 12 wherein:
said single control means comprises additional independent secondary windings, one for each of said transformers;
said additional secondary windings are in inductive relation each with its associated primary; and
voltage regulation means are provided for controlling the voltage induced in said additional secondaries.

15. A circuit according to claim 12 wherein voltage limiting means is interconnected with said primary windings so as to limit the voltage across each of said primary windings alternately in response to alternations of the current of the source while leaving the voltage of the other primary winding unlimited by said voltage limiting means.

16. A circuit according to claim 15 wherein:
said primary windings are serially connected with each other;
a pair of back to back connected rectifiers is connected in parallel with the series connected primary windings;
the voltage limiting means comprises a Zener diode having one terminal connected to the common junction of said primary windings and the other terminal connected to the common junction of said rectifiers;
said diode being poled to limit the voltage across both of said primaries.

References Cited

UNITED STATES PATENTS

| | | | |
|---|---|---|---|
| 3,154,695 | 10/1964 | MacGregor et al. | 307—88.5 |
| 3,175,076 | 3/1965 | Fox et al. | 323—22 |
| 3,193,725 | 7/1965 | Skirpan | 323—22 |
| 3,219,908 | 11/1965 | Zarleng | 307—88.5 |

FOREIGN PATENTS

| | | |
|---|---|---|
| 622,174 | 4/1949 | Great Britain. |

JOHN F. COUCH, *Primary Examiner.*

M. WACHTELL, *Assistant Examiner.*